(12) United States Patent
Elsaesser

(10) Patent No.: US 7,789,960 B2
(45) Date of Patent: *Sep. 7, 2010

(54) CLAY PLASTER

(76) Inventor: Armin Croft Elsaesser, 8724 Alameda Park Dr., NE., Albuquerque, NM (US) 87113

( * ) Notice: Subject to any disclaimer, the term of this patent is extended or adjusted under 35 U.S.C. 154(b) by 0 days.

This patent is subject to a terminal disclaimer.

(21) Appl. No.: 12/364,991

(22) Filed: Feb. 3, 2009

(65) Prior Publication Data

US 2009/0183652 A1    Jul. 23, 2009

Related U.S. Application Data

(62) Division of application No. 10/462,997, filed on Jun. 17, 2003, now Pat. No. 7,485,186.

(60) Provisional application No. 60/389,562, filed on Jun. 17, 2002.

(51) Int. Cl.
*C04B 33/00* (2006.01)
*C04B 14/10* (2006.01)
*C04B 14/12* (2006.01)
*C04B 35/66* (2006.01)
*C09C 1/42* (2006.01)

(52) U.S. Cl. .................. 106/811; 106/286.1; 106/286.5; 106/286.8; 106/287.17; 106/486; 106/487; 106/711; 106/712; 106/812; 501/141; 501/143; 501/144

(58) Field of Classification Search ............... 106/286.1, 106/286.5, 286.8, 287.17, 486, 487, 811, 106/711, 712, 812; 501/141, 143, 144
See application file for complete search history.

(56) References Cited

U.S. PATENT DOCUMENTS

| | | | |
|---|---|---|---|
| 1,509,406 A | 9/1924 | Kraus | |
| 1,629,714 A | 5/1927 | Kraus | |
| 1,747,551 A | 2/1930 | Kraus | |
| 1,885,731 A | 11/1932 | Kraus | |
| 1,992,916 A | 2/1935 | Johnson | |
| 1,994,096 A | 3/1935 | Coss | |
| 3,649,315 A | 3/1972 | Booth | |
| 3,689,611 A | 9/1972 | Hardy et al. | |
| 3,817,763 A | 6/1974 | Henry, Jr. et al. | |
| 4,056,398 A * | 11/1977 | Rechter et al. | ............... 501/131 |
| 4,292,084 A * | 9/1981 | Thrower et al. | ............. 501/107 |
| 4,432,798 A | 2/1984 | Helferich et al. | |
| 4,737,326 A | 4/1988 | Wirth et al. | |
| 4,880,759 A | 11/1989 | Kohut | |
| 5,252,526 A | 10/1993 | Whittemore | |
| 5,395,438 A | 3/1995 | Baig et al. | |
| 6,024,790 A | 2/2000 | Allen et al. | |
| 6,458,732 B1 | 10/2002 | Doza et al. | |
| 6,569,797 B1 | 5/2003 | Brosnan | |
| 7,485,186 B2 * | 2/2009 | Elsaesser | ..................... 106/811 |

FOREIGN PATENT DOCUMENTS

| | | |
|---|---|---|
| CA | 2055253 | 8/1992 |
| GB | 890553 | 3/1962 |
| GB | 1464720 | 2/1977 |
| GB | 2024798 | 1/1980 |
| GB | 216978 | 7/1986 |
| GB | 2169278 | 7/1986 |
| JP | 08-253352 A * | 10/1996 |
| RU | 2057741 | 4/1996 |
| SU | 403643 | 3/1974 |
| SU | 1057160 | 11/1983 |
| SU | 1158543 | 5/1985 |
| SU | 1313831 | 5/1987 |
| WO | WO-8901921 | 3/1989 |

OTHER PUBLICATIONS www.constructionresources.com/products/clayplast.htm; Construction Resources Product Data May 23, 2003.
www.grupo-porgas.com/adobe.html; Budwell-Patane Creations Adobe May 23, 2003.
Derwent-Acc-No: 1977-68242Y Abstract of SU 532589A [Dec. 1976].
Derwent-Acc-No: 1979-69591B Abstract of SU 638577A [Dec. 1978].
Derwent-Acc-No: 1981-33859D Abstracte of SU 759488B [Aug. 1980].
Derwent-Acc-No: 1983-825675 Abstract of SU 992484A [Jan. 1993].
Chemical Abstracts Citation 67:76018 for GB 1071286 [Jun. 1967].
"Grant & Hackh's Chemical Dictionary", Fifth Edition, McGraw-Hill, Inc. 1987.
"Production of Foamed ceramic material using abrasion sludege and waste glass giver", Derwent-Acc-No: 2002-326335 Abstract of KR2001061060A [Jun. 2003].
Filatova, "Aq. compsn. for painting silicate brickes", Derwent-Acc-No: 1988-351899 Abstract of SU 1397464A [May 1988].

* cited by examiner

*Primary Examiner*—Anthony J Green
(74) *Attorney, Agent, or Firm*—Deborah A. Peacock; Samantha A. Updegraff; Peacock Myers, P.C.

(57) ABSTRACT

A clay plaster formulation and application. The clay plaster is a mixture of various clays, and aggregate. This plaster is both functional and decorative and is for use on new and existing construction.

15 Claims, No Drawings

CLAY PLASTER

CROSS-REFERENCE TO RELATED APPLICATIONS

This application is a divisional application of U.S. patent application Ser. No. 10/462,997, filed Jun. 17, 2003, issuing as U.S. Pat. No. 7,485,186 on Feb. 3, 2009, entitled "Clay Plaster", which claims priority to and the benefit of the filing of U.S. Provisional Patent Application Ser. No. 60/389,562 filed Jun. 17, 2002, and the specification and claims thereof are incorporated herein by reference.

BACKGROUND OF THE INVENTION

1. Field of the Invention (Technical Field)

The present invention relates to various clay plaster formulations and the application thereof.

2. Description of Related Art

Note that the following discussion refers to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes.

Websites for Construction Resources Product Data and Budwell-Patane Creations disclose clay mixtures clay mixed with sand and straw, and with cactus juice, respectively. These mixtures are not a variety of clays in a mixture with aggregates and optionally fibers. Additionally, the dates of introduction of these products are unknown.

U.S. Pat. No. 6,025,790 to Allen dated Feb. 15, 2000, discloses the activation of bentonite for paper making by the use of sodium citrate, organic sequestering agents and dry blends of the activator combined with bentonite. This process does not use bentonite to create a clay mixture used in plastering.

U.S. Pat. No. 1,885,731 to Kraus, dated Nov. 1, 1932, discloses improvements to hydraulic cements or mortars to increase plasticity, increase working quality and improve drying strength. This process also discloses montmorillonite, lime, an alkaline solution, and plasticizing cement by the addition of bentonite, or other clays. This process does not use a mixture of clays with an aggregate and fiber for use as a clay plaster, and does not provide for applications of a clay plaster.

U.S. Pat. No. 1,747,551 to Kraus dated Feb. 18, 1930, discloses a process for making inexpensive plaster with improved qualities (e.g. plasticity and set). This process adds colloidal alumina, silica and alkaline earth to the mixture. This process does not use a mixture of clays with an aggregate and fiber to use as a clay plaster, and does not provide for applications of the clay plaster.

U.S. Pat. No. 1,629,714 to Kraus dated May 24, 1927, discloses a process to increase plasticity of kaolin, clay, bauxite, calcium carbonate, flint, shale, cement rock, and asbestos relating to an amount of water required for mixture. This process incorporates montmorillonite (including bentonite) and other agents including silica soda. It is related to improving the bond qualities of clay for the improvement of ceramic wares. This process is not for the application of clays as a building material.

U.S. Pat. No. 1,509,406 to Kraus dated Sep. 23, 1924, discloses a process to increase the plasticity of clay and other mineral substances for the purposes of firing those clays and mineral substances. This process is not for the application of clays as a building material.

The present invention comprises various clays, aggregates, and optionally fibers to provide improved qualities and building applications of clay plaster.

BRIEF SUMMARY OF THE INVENTION

The present invention relates to an earthen plaster formulation comprising various clays, aggregates, and optionally fibers, and applications thereof. This formulation is especially useful for interior and exterior use as a plaster or building material. The formulation has functional and decorative qualities.

The formulation is applied in alternative manners, finishes and decorative styles. Application of the present invention can be on existing or new construction, and on a variety of base materials.

The present invention relates to an earthen plaster formulation comprising at least two clays and at least one aggregate. Preferably, the plaster formulation comprises at least one of the following clays: kaolin, ball clay, or fireclay. The percentages of clays in the formulation preferably comprise up to approximately 30% by weight; more preferably between approximately 2.7 and 24% by weight; more preferably between approximately 5% and 19% by weight; more preferably between approximately 7.3% and 16% by weight; and most preferably between approximately 8.7% and 15.2% by weight.

The plaster formulation also comprises at least one clay from the family of clays known as expanding clays. The expanding clay is present in the formulation preferably in an amount up to approximately 5% by weight; more preferably between approximately 0.5% and 3.9% by weight; more preferably between approximately 1.3% and 3.4% by weight; and most preferably between approximately 2.1% and 2.75% by weight.

The earthen plaster formulation may comprise various mixtures of the clays. These mixtures include, but are not limited to: kaolin and ball clay; kaolin and fireclay; kaolin and the expanding clay; kaolin, ball clay, and fireclay; kaolin and ball clay and the expanding clay; kaolin, ball clay, fireclay, and the expanding clay; kaolin, fireclay, and the expanding clay; ball clay and fireclay; ball clay and the expanding clay; ball clay, fireclay and the expanding clay; fireclay and the expanding clay; and other possible mixtures.

The plaster formulation may also comprise a color additive, such as in the form of a powder pigment. The plaster formulation comprises between approximately 0.1% and 10% by weight of the color additive. Some preferred color additives comprise Burnt Sienna, Raw Sienna, Yellow Oxide, Black Earth, Green Earth, and the like. The addition of an organic fiber, such as straw, may change the percentage of pigment added to the formulation, however the preferred range of color additive(s) comprises between approximately 0.1% and 10% by weight.

An acid (e.g. boric acid in the preferred form of borax) may also be added to the plaster formulation. The preferred percentage range of added acid comprises between approximately 1% and 7% by weight.

The plaster formulation comprises at least one aggregate, such as calcium carbonate, sand, silt, silica, calcined clay, grog, marble dust, shell sand, and the like. The preferred aggregate is calcium carbonate. The plaster formulation preferably has a size range of between approximately 1000 microns and 5 microns. The preferred ranges of aggregate in the plaster formulation are up to approximately 76% by weight; more preferably between approximately 5% and 75% by weight; more preferably between approximately 10% and 74% by weight; more preferably between approximately 15% and 73% by weight; and most preferably between approximately 18.4% and 72% by weight.

The plaster formulation may further comprise a fiber. This fiber material may be any fibrous additive, such as, but not limited to straw, hair, plant fibers, organic fibers, non-organic fibers, and the like. The preferred ranges of fiber in the plaster formulation are up to approximately 5% by weight; more preferably between approximately 0.5% and 4% by weight of said fiber; more preferably between approximately 1% and 3.5% by weight; and most preferably between approximately 1.4% and 3.1% by weight.

A preferred plaster formulation comprises between approximately 0% and 30% by weight of kaolin, between approximately 0% and 30% by weight of ball clay by weight, between approximately 0% and 30% by weight of fireclay, between approximately 0% and 5% by weight of expanding clay, between approximately 0% and 76% by weight of aggregate, and between approximately 0% and 5% by weight of fiber, wherein at least two clays present in the formulation are greater than 0% by weight. A more preferable formulation of the plaster formulation comprises between approximately 2.7% and 24% by weight of kaolin, between approximately 2.7% and 24% by weight of ball clay, between approximately 2.7% and 24% by weight of fireclay, between approximately 0.5% and 3.9% by weight of expanding clay, between approximately 5% and 75% by weight of aggregate, and between approximately 0.5% and 4% by weight of fiber. More preferably, the plaster formulation comprises between approximately 5% and 19% by weight of kaolin, between approximately 5% and 19% by weight of ball clay, between approximately 5% and 19% by weight of fireclay, between approximately 1.3% and 3.4% by weight of expanding clay, between approximately 10% and 74% by weight of aggregate, and between approximately 1% and 3.5% by weight of fiber. Another, more preferable plaster formulation comprises between approximately 7.3% and 16% by weight of kaolin, between approximately 7.3% and 16% by weight of ball clay, between approximately 7.3% and 16% by weight of fireclay, between approximately 1.7% and 2.9% by weight of expanding clay, between approximately 15% and 73% by weight of aggregate, and 1.4% and 3.1% by weight of fiber. Most preferably, the plaster formulation comprises between approximately 8.7% and 15.2% by weight of kaolin, between approximately 8.7% and 15.2% by weight of ball clay, between approximately 8.7% and 15.2% by weight of fireclay, between approximately 2.1% and 2.75% by weight of expanding clay, between approximately 18.4% and 72% by weight of aggregate, and up to approximately 1.4% by weight of fiber.

The plaster formulation may also contain a sealant. The sealant comprises at least one member selected from the group consisting of modern chemical plaster sealants, natural sealants, cactus juice, and milk paint. Additionally, the plaster formulation may contain a decorative element.

The present invention also relates to a method for the application of an earthen plaster formulation, preferably using the plaster formulations described herein The method of applying the plaster formulation to a surface comprises applying it to a new or existing surface. The plaster formulation may also be applied to an interior or exterior surface. The method of applying the plaster to a surface comprises plastering techniques, such as hand troweling, floating with a sponge or brush, traditional drywalling techniques, finishing, and the like. Other techniques, such as applying base, bonding, coarse, and finishing layers, may also be utilized.

The plaster formulation may be repaired by storing the plaster and rewetting and applying the stored plaster to the surface at a later date. Application of the stored plaster at a later date results in substantially no color difference from the prior applied clay plaster. The plaster formulation may be stored for weeks to months to years. Additionally, plaster that has been previously applied can be wetted and then finished in place (e.g. for a crack) or applied to a different surface or a different area on the surface (e.g. if no stored plaster is available).

The plaster formulation can be applied to a variety of surfaces, and for a variety of purposes. These include, but are not limited to: directly applying the plaster to plaster board; directly applying the plaster to a breathable wall system as a bonding layer; directly applying the plaster to a breathable wall system as a finish layer; and directly applying the plaster to porous masonry.

The plaster formulation can also be directly applied to a painted base. Preferably, when applying the plaster to a painted base, the plaster formulation is used in conjunction with a commercially available primer with a sanded texture.

Alternative embodiments of the present invention include the addition of: calcined plaster, sealants, fiber, color pigment, or acid to the plaster formulation. Artistic details such as stamping or building up the applied plaster are alternative embodiments of the method of the present invention.

A primary object of the present invention is to provide a mixture of various clays, aggregate and optionally fibers and other additives, to provide adequate color quality, workability, plasticity, and reduction in shrinkage for plaster applications.

A primary advantage of the present invention is the aesthetics, reduction in shrinkage, cracking and ease in repair of the plaster.

Other objects, advantages and novel features, and further scope of applicability of the present invention will be set forth in part in the detailed description to follow, and in part will become apparent to those skilled in the art upon examination of the following, or may be learned by practice of the invention.

The objects and advantages of the invention may be realized and attained by means of the instrumentalities and combinations particularly pointed out in the appended claims.

DETAILED DESCRIPTION OF THE INVENTION

The plaster formulation of the present invention comprises a mixture of clays, aggregates and optionally fibers. The formulation weight percentages, set forth below, provide the preferred percentages (by weight) of materials that are useful in producing an earthen plaster, typically with commercial clays available. However, the present invention is not limited to these weight percentages.

The formulations are a combination of clays to provide aesthetics, color quality, workability, plasticity, and reduction in shrinkage. They also require the least amount of "dusting" when applied and worked properly with standard plastering techniques. The reduced shrinkage is apparent by the lack of cracking which occurs during the drying of the plaster on the applied surface. The workability is provided by the addition of the expanding clays or smectite-group clays (e.g. montmorillonite, bentonite). This provides the lubrication during application and also reduces the "dusting" upon drying.

The formulations range in the percentages of clays, aggregates and fibers that are combined. For example, in the preferred broadest range, the formulation comprises between approximately 0% and 30% by weight of kaolin clay, between approximately 0% and 30% by weight of ball clay, between approximately 0% and 30% by weight of fireclay, between approximately 0% and 5% by weight of a family of clays known as expanding clays, between approximately 0% and 76% by weight of aggregate, and between approximately 0% and 5% by weight of fiber. A more preferred range of the formulation is between approximately 2.7% and 24% by weight of kaolin clay, between approximately 2.7% and 24% by weight of ball clay, between approximately 2.7% and 24% by weight of fireclay, between approximately 0.5% and 3.9% by weight of expanding clay, between approximately 5% and 75% by weight of aggregate, and between approximately 0.5% and 4% by weight of fiber. A more preferred range is between approximately 5% and 19% by weight of kaolin clay, between approximately 5% and 19% by weight of ball clay, between approximately 5% and 19% of fireclay, between approximately 1.3% and 3.4% by weight of expanding clay, between approximately 10% and 74% by weight of aggregate, and between approximately 1% and 3.5% by weight of fiber. Yet a more preferred range for the formulation is between approximately 7.3% and 16% by weight of kaolin clay, between approximately 7.3% and 16% by weight of ball clay, between approximately 7.3% and 16% by weight of fireclay, between approximately 2.1% and 2.75% by weight of expanding clay, and between approximately 15% and 73% by weight of aggregate, and up to approximately 1.4% by weight of fiber. The most preferred formulation for this invention is between approximately 8.7% and 15.2% by weight of kaolin clay, between approximately 8.7% and 15.2% by weight of ball clay, between approximately 8.7% and 15.2% by weight of fireclay, up to approximately 2.6% by weight of expanding clay, and between approximately 18.4% and 72% by weight of aggregate.

The preferred fiber comprises an organic material, such as straw. Other possible fibers include, but are not limited to, hair, and other plant fibers. It is also possible to utilize non-organic fibers as a substitute (i.e. fiberglass). The percentage of material depends greatly on the weight to volume ratio of the fiber intended to be used. Cellulose can also be added to improve the bonding structure of the clay plaster in amounts up to approximately 25% by weight.

Calcium carbonate (e.g. marble dust) is preferably at least one of the aggregates in the formulation. Other possible aggregates include, but are not limited to, sand, silt, silica, calcined clay, and shell sand.

The particle size for the aggregate preferably ranges between approximately 1000 microns and 5 microns. The percent retained on the individual mesh varies from distributor to distributor. The greater number of large particles reduces the amount of shrinkage, but also requires a larger percentage of clay to bind the particles together. As the particle size decreases, the smoothness of the plaster greatly increases, but the shrinkage of the clays also increases, causing cracks. This requires more time smoothing out these imperfections during the re-working of the material. Therefore, a preferred particle distribution is utilized. Slight variations are to be expected and minor adjustments are acceptable. The additional aggregate used determines the final finishing qualities. The finer the aggregate, the finer the finish. Anything larger than 1000 microns, except in trace quantities, degrades the finish and workability of the plaster.

The preferred particle distribution for the primary aggregate in this invention, in percent retained on a mesh size in microns, is: 600 micron mesh size corresponding to trace weight percentage retained; 425 micron mesh size to approximately 2% retained; 212 micron mesh size to approximately 27% retained; 150 micron mesh size to approximately 46% retained; and anything smaller than 150 microns mesh size to greater than approximately 25% retained.

In an alternative embodiment, the addition of certain decorative particles further enhances the appearance of the plaster and provides for further artistic effects. Some examples are mica and mother-of-pearl. These additives are included in amounts ranging from between approximately 0% and 5% by weight with the other ingredients adjusted accordingly.

The addition of certain acids may further decrease the shrinkage of the final surface during the initial drying period of the earth plaster. The preferred acid is acetic acid in small quantities (0.0125% by volume of water added). Other stronger acids can be used in lesser quantities, but cause a breakdown in the aggregate and cause application problems. Other possible additives are boric acid (e.g. borax) and citric acid. These produce similar effects as the acetic acid with the boric acid also providing an anti-fungal quality and additional fire retardant properties in the clay when natural fibers, such as straw, are present. These are added in percentages between approximately 0% and 10% by weight. Preferably, the boric acid is between approximately 1% and 7% (e.g. 2.4%) by weight with the other ingredients adjusted accordingly, and acetic acid no greater than approximately 1% by volume. The addition of acids implicitly covers any combination and or substitute.

The present invention is directed to a clay plaster and also the method of application. There are several ways for the plaster of the present invention to adhere to new or existing construction. Application on existing construction is dependent on what the base material is (e.g. the base material on the walls). For example, if the base has been painted, it is preferable to use a sanded primer. This can be a commercially available primer with sanded texture added, or a commercially available mixture (e.g. Binder/Primer Mortar).

The plaster of the present invention is then applied using similar plastering techniques known in the art. However, the final finish is not acquired until after a drying period of between approximately 8 and 24 hours depending on the atmospheric conditions present at the time. The plaster may require a reworking at that time to smooth out any shrinkage that has occurred. This is accomplished by a hand trowel technique, or a floating with a sponge or brush. A similar technique is applied to new construction using traditional drywall techniques known by those skilled in the art.

If the old construction is of a porous masonry, such as brick or block, the plaster may be applied directly over the existing structure. The same is true of new construction of the same products. Another application for new construction is using a plaster board product that accepts a plaster directly to the board. This type of construction generally requires that the seams be taped with a scrim material, either a commercially available fiberglass tape, or jute fabric (i.e. burlap). Both require the material to be mudded in with the plaster material. The final coat is then applied in two thin coats with the final thickness preferably not exceeding ¼".

For a breathable wall system, a "reed board" can be used instead of gypsum board or plaster board. This provides a renewable building resource as an alternative to the other-mentioned building boards. This system requires a standard frame house. The reed board is applied using normal fastening techniques. A layer of earth plaster is applied over the board followed by a layer of cloth (e.g. jute) to further create a bonding layer. Plaster is applied to further strengthen the wall system, followed by a finish plaster. The exterior wall can also be finished in the same application if adequate overhangs have been incorporated into the building design to prevent moisture from setting against the building. The finish coat can also be a lime plaster or lime wash if the precautions mentioned above are not taken into consideration. This system allows vapor permeability between both the exterior and interior layers. This is known as a breathable wall application. Some other applications are adobe, straw bale and cob building.

An alternative for exterior applications is to stabilize the earth plaster of the present invention with a calcined plaster (portland cement, lime, or gypsum plaster). This stabilizes the formulation and introduces a chemical matrix. The addition of this matrix eliminates the workability after the initial drying of the product. The shelf-life of the product is then limited to that of the additive. Lime, as it is exposed to moisture in the air begins to calcify along with the other cements, decreasing the shelf life and diminishing the stabilizing quality. Therefore it should be added as needed during application.

If additional protection is desired, sealants can be utilized. Sealant alternatives range from commercially available modern plaster sealants (e.g. chemical sealants) to natural sealants (e.g. cactus juice and milk paint).

The plaster product of the present invention also lends itself to artistic applications as well as traditional plastering methods. Built-up areas can be formed into sculptural details, or stamped with images for a further enhanced decorative effect.

The ease of repair using the plaster of the present invention is greater than using any of the prior art calcined plastering products. The area of repair only needs to be pre-wetted, and new material that has been retained for this purpose applied in the same fashion as it was previously applied to the surface. The standard problem of color variations is eliminated because the dry rate remains constant. The material is from the same batch. If required, material from hidden areas of the wall can be removed, wetted to the desired consistency and applied to the patch area. When new material is obtained, the hidden area of the wall can be patched. Color variation will occur from batch to batch since only natural materials are utilized. Color variation for the raw materials used in the manufacturing of the present invention is to be expected. If cracks appear due to settling of the structure, the saved material only need be wetted and surfaced as the original application was applied. The crack(s) are filled with material spread from the surface. The material can be saved or stored for an indefinite time period (e.g. a few weeks to months to several years), for use at a later time for patching or repair.

INDUSTRIAL APPLICABILITY

The invention is further illustrated by the following non-limiting examples.

Example

The following table shows the preferred formulations for specific colors and a 600 micron plaster sand for the additional aggregate required (it is possible to use a variety of plastering sands for the additional aggregate, from an 850 micron to as fine as an 180 micron and smaller marble dust).

The formulations in Table 1 range in the percentages of clays, aggregates and powder pigments that are combined for the desired color. The preferred formulation comprising the color red is between approximately 45% and 60% by weight of marble, between approximately 13% and 22% by weight of sand, between approximately 8% and 18% by weight of kaolin, between approximately 8% and 18% by weight of fireclay (e.g. Lincoln 60), between approximately 1% and 7% by weight of bentonite, and between approximately 1% and 7% by weight of Burnt Sienna. The preferred formulation comprising the color tan is between approximately 45% and 60% by weight of marble, between approximately 3% and 13% by weight of sand, between approximately 8% and 18% by weight of kaolin, between approximately 8% and 18% by weight of fireclay (e.g. Lincoln 60), between approximately 1% and 7% by weight of bentonite, between approximately 1% and 7% by weight of Raw Sienna, and between approximately 0.1% and 1% by weight of Burnt Sienna. The preferred formulation comprising the color yellow is between approximately 45% and 60% by weight of marble, between approximately 13% and 22% by weight of sand, between approximately 8% and 18% by weight of kaolin, between approximately 8% and 18% by weight of fireclay (e.g. Lincoln 60), between approximately 1% and 7% by weight of bentonite, and between approximately 1% and 5% by weight of Yellow Oxide. The preferred formulation comprising the color grey is between approximately 45% and 60% by weight of marble, between approximately 13% and 22% by weight of sand, between approximately 8% and 18% by weight of kaolin, between approximately 8% and 18% by weight of fireclay (e.g. Lincoln 60), between approximately 1% and 7% by weight of bentonite, and between approximately 1% and 7% by weight of Black Earth pigment. The preferred formulation comprising the color green is between approximately 45% and 60% by weight of marble, between approximately 13% and 22% by weight of sand, between approximately 8% and 18% by weight of kaolin, between approximately 8% and 18% by weight of fireclay (e.g. Lincoln 60), between approximately 1% and 7% by weight of bentonite, and between approximately 1% and 10% by weight of Green Earth pigment.

Table 2 shows the formulations resulting in preferred colors with the addition of straw instead of additional aggregate. The straw is mulched and sifted through a standard house screen to remove the ribs and large pieces before it is added to the formulation.

TABLE 1

Preferred Color Formulations

| Red | Wt % | Tan | Wt % | Yellow | Wt % | Grey | Wt % | Green | Wt % |
|---|---|---|---|---|---|---|---|---|---|
| Marble | 51.3% | Marble | 51.8% | Marble | 51.9% | Marble | 51.9% | Marble | 50.0% |
| Sand | 17.9% | Sand | 8.1% | Sand | 18.2% | Sand | 18.2% | Sand | 17.5% |
| Kaolin | 12.8% | Kaolin | 12.9% | Kaolin | 13.0% | Kaolin | 13.0% | Kaolin | 12.5% |
| Fireclay | 12.8% | Fireclay | 12.9% | Fireclay | 13.0% | Fireclay | 13.0% | Fireclay | 12.5% |
| Bentonite | 2.6% | Bentonite | 2.6% | Bentonite | 2.6% | Bentonite | 2.6% | Bentonite | 2.6% |
| Burnt Sienna | 2.6% | Raw Sienna | 1.2% | Yellow Oxide | 1.3% | Black Earth | 1.3% | Green Earth | 5.0% |
| | | Burnt Sienna | 0.4% | | | | | | |

TABLE 2

Preferred Color Formulation with Straw

| Red | Wt % | Tan | Wt % | Green | Wt % |
|---|---|---|---|---|---|
| Marble | 61.7% | Marble | 62.4% | Marble | 59.8% |
| Straw | 1.4% | Straw | 1.4% | Straw | 1.3% |
| Kaolin | 15.4% | Kaolin | 15.6% | Kaolin | 15.0% |
| Fireclay | 15.4% | Fireclay | 15.6% | Fireclay | 15.0% |
| Bentonite | 3.1% | Bentonite | 3.1% | Bentonite | 3.0% |
| Burnt Sienna | 3.1% | Raw Sienna | 1.5% | Green Earth | 6.0% |
|  |  | Burnt Sienna | 0.5% |  |  |

The formulations in Table 2 range in the percentages of clays, aggregate, fiber and powder pigments that are combined for the desired color. The preferred formulation comprising the color red is between approximately 55% and 65% by weight of marble, between approximately 1% and 7% by weight of straw, between approximately 10% and 20% by weight of kaolin, between approximately 10% and 20% by weight of fireclay (e.g. Lincoln 60), between approximately 1% and 8% by weight of bentonite, and between approximately 1% and 7% by weight of Burnt Sienna. The preferred formulation comprising the color tan is between approximately 55% and 65% by weight of marble, between approximately 1% and 7% by weight of straw, between approximately 10% and 20% by weight of kaolin, between approximately 10% and 20% by weight of fireclay (e.g. Lincoln 60), between approximately 1% and 8% by weight of bentonite, and between approximately 1% and 7% by weight of Raw Sienna, and between approximately 0.1% and 1% by weight of Burnt Sienna. The preferred formulation comprising the color green is between approximately 55% and 65% by weight of marble, between approximately 1% and 7% by weight of straw, between approximately 10% and 20% by weight of kaolin, between approximately 10% and 20% by weight of fireclay (e.g. Lincoln 60), between approximately 1% and 8% by weight of bentonite, and between approximately 1% and 11% by weight of Green Earth pigment.

Another option is the addition of borax-decahydrate. Table 3 shows the preferred formulations for specific colors with borax-decahydrate added. Borax is added in lieu of boric acid and has a primary function of retarding the deterioration of organic compounds in fibers and from the addition of low quality water. The pigments in Table 3 are added at a percentage of a total weight of the formulation.

and 17% by weight of fireclay (e.g. Hawthorne), between approximately 1% and 7% by weight of bentonite, between approximately 1% and 7% by weight of borax-decahydrate, and between approximately 1% and 7% by weight of Burnt Sienna. The preferred formulation comprising the color tan is between approximately 65% and 76% by weight of marble, between approximately 7% and 17% by weight of kaolin, between approximately 7% and 17% by weight of fireclay (e.g. Hawthorne), between approximately 1% and 7% by weight of bentonite, between approximately 1% and 7% by weight of borax-decahydrate, between approximately 1% and 7% of Raw Sienna, and between approximately 0.1% and 1% by weight of Burnt Sienna. The preferred formulation comprising the color yellow is between approximately 65% and 76% by weight of marble, between approximately 7% and 17% by weight of kaolin, between approximately 7% and 17% by weight of fireclay (e.g. Hawthorne), between approximately 1% and 7% by weight of bentonite, between approximately 1% and 7% by weight of borax-decahydrate, and between approximately 1% and 7% by weight of Yellow Oxide. The preferred formulation comprising the color grey is between approximately 65% and 76% by weight of marble, between approximately 7% and 17% by weight of kaolin, between approximately 7% and 17% by weight of fireclay (e.g. Hawthorne), between approximately 1% and 7% by weight of bentonite, between approximately 1% and 7% by weight of borax-decahydrate, and between approximately 1% and 7% by weight of Black Earth pigment. The preferred formulation comprising the color green is between approximately 65% and 76% by weight of marble, between approximately 7% and 17% by weight of kaolin, between approximately 7% and 17% by weight of fireclay (e.g. Hawthorne), between approximately 1% and 7% by weight of bentonite, between approximately 1% and 7% by weight of borax-decahydrate, and between approximately 1% and 10% by weight of Green Earth pigment.

Table 3 shows the preferred clays included in the plaster formulation. The preferred clays comprise between approximately 7% and 17% by weight of kaolin, between approximately 7% and 17% by weight of fireclay (e.g. Hawthorne), and between approximately 1% and 7% by weight of bentonite.

The above formulations are for a finish earth plaster. The base coat plasters which can be produced can also be used as a finish plaster if a coarse finish is desired. The size of the

TABLE 3

Preferred Color Formulations with Borax-Decahydrate

| Red | Wt % | Tan | Wt % | Yellow | Wt % | Grey | Wt % | Green | Wt % |
|---|---|---|---|---|---|---|---|---|---|
| Marble | 71.4% | Marble | 71.4% | Marble | 71.4% | Marble | 71.4% | Marble | 71.4% |
| Kaolin | 11.9% | Kaolin | 11.9% | Kaolin | 11.9% | Kaolin | 11.9% | Kaolin | 11.9% |
| Fireclay | 11.9% | Fireclay | 11.9% | Fireclay | 11.9% | Fireclay | 11.9% | Fireclay | 11.9% |
| Bentonite | 2.4% | Bentonite | 2.4% | Bentonite | 2.4% | Bentonite | 2.4% | Bentonite | 2.4% |
| Borax | 2.4% | Borax | 2.4% | Borax | 2.4% | Borax | 2.4% | Borax | 2.4% |
| Burnt Sienna | 2.6% | Raw Sienna | 1.2% | Yellow Oxide | 1.3% | Black Earth | 1.3% | Green Earth | 5.0% |
|  |  | Burnt Sienna | 0.4% |  |  |  |  |  |  |

The formulations in Table 3 range in the percentages of clays, aggregate, borax-decahydrate and powder pigments that are combined for the desired color. The preferred formulation comprising the color red is between approximately 65% and 76% by weight of marble, between approximately 7% and 17% by weight of kaolin, between approximately 7% aggregate and fiber determine the final surface of the plaster and grade. If the aggregate is of a larger particle size, the final finish will have more surface irregularities, and allow for a thicker application. The same is true of the fiber material.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An earthen plaster formula comprising:
   at least two clays, one of said clays comprising a kaolin clay;
   a color additive;
   at least one aggregate;
   a fiber;
   decorative particles; and
   a sealant.

2. The plaster formula of claim 1 wherein at least one of said clays comprises expanding clay.

3. The plaster formula of claim 1 wherein at least one of said clays comprises ball clay.

4. The plaster formula of claim 1 wherein at least one of said clays comprises fireclay.

5. The plaster formula of claim 1 wherein said color additive comprises a powder pigment.

6. The plaster formula of claim 1 further comprising an acid.

7. The plaster formula of claim 1 wherein said aggregate has a size range of between approximately 1000 microns and 5 microns.

8. An earthen plaster formula comprising:
   at least two clays, one of said clays comprising a kaolin clay;
   at least one aggregate;
   an acid;
   a fiber; and
   a sealant.

9. The plaster formula of claim 8 wherein at least one of said clays comprises expanding clay.

10. The plaster formula of claim 8 wherein at least one of said clays comprises ball clay.

11. The plaster formula of claim 8 wherein at least one of said clays comprises fireclay.

12. The plaster formula of claim 8 further comprising a color additive.

13. The plaster formula of claim 8 wherein said acid comprises as least one acid selected from the group consisting of borax-decahydrate, boric acid, acetic acid, and citric acid.

14. The plaster formula of claim 8 wherein said aggregate has a size range of between approximately 1000 microns and 5 microns.

15. The plaster formula of claim 8 further comprising decorative particles.

* * * * *